TAPE VELOCITY CHANGE DETECTION CIRCUIT

Filed June 27, 1963 5 Sheets-Sheet 1

INVENTORS
LEWIS L. HEADRICK
EARL W. MILLER
BY
Bernard M. Goldman
ATTORNEY

May 16, 1967 L. L. HEADRICK ET AL 3,320,600

TAPE VELOCITY CHANGE DETECTION CIRCUIT

Filed June 27, 1963

5 Sheets-Sheet 3

TAPE VELOCITY CHANGE DETECTION CIRCUIT

United States Patent Office 3,320,600

Patented May 16, 1967

3,320,600
TAPE VELOCITY CHANGE DETECTION CIRCUIT

Lewis L. Headrick, Wappingers Falls, and Earl W. Miller, Poughkeepsie, N.Y., assignors to International Business Machines Corporation, New York, N.Y., a corporation of New York Filed June 27, 1963, Ser. No. 291,062
11 Claims. (Cl. 340—174.1)

This invention relates to a circuit that can detect an improper acceleration or deceleration for magnetic tape. In particular this invention provides a circuit which can detect a forthcoming failure in capstan operation on a tape drive.

After initial adjustment and testing at the factory, prior digital tape drives generally had no means for determining when the capstan acceleration or deceleration response was deteriorating, before it had actually deteriorated to the point which caused errors to be written on tape. Accordingly in past systems, it was generally not known that the capstan start-stop operation was improper until data errors were noticed on tape. However there were so many sources for errors on tape other than capstan movement, that the mere fact an error was detected in reading tape gave no definite indication that the capstan was at fault.

Accordingly, it is the principal object of this invention to provide a circuit for detecting a particular tape acceleration or deceleration characteristic.

It is another object of this invention to provide means for detecting a particular acceleration or deceleration characteristic for tape that is indicative of improper tape operation.

It is a further object of this invention to provide means for determining deterioration in the capstan operation of a tape drive prior to the time that the capstan function has deteriorated to the point where it would cause errors in the reading or writing of data.

This invention utilizes a means for determining a tape speed ratio by recording at least two indications in sequence with a particular time spacing. When reading the tape, the time between the first and a later indication is compared to a time that has a fixed ratio to the time for writing the indications. The comparison provides a signal that a particular tape speed ratio has been exceeded.

The foregoing and other objects, features and advantages of the invention will be apparent from the following more particular description of the preferred embodiment of the invention, as illustrated in the accompanying drawings.

Figure 1:
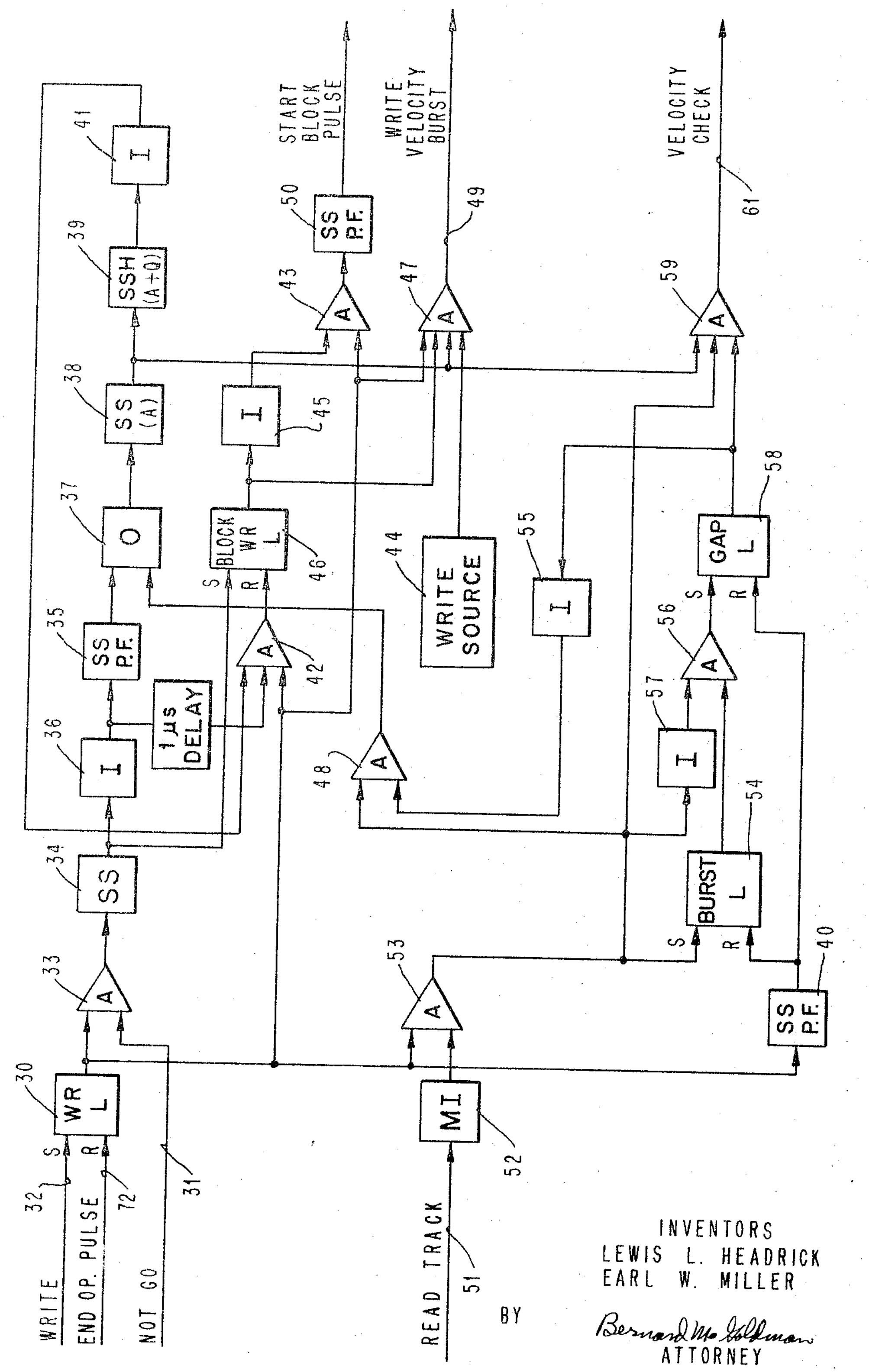
FIGURE 1 represents an embodiment of this invention.
Figure 3:
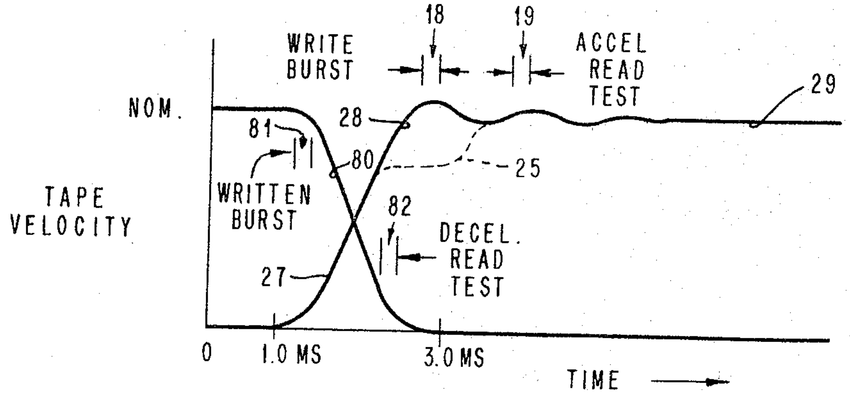
Figure 4:
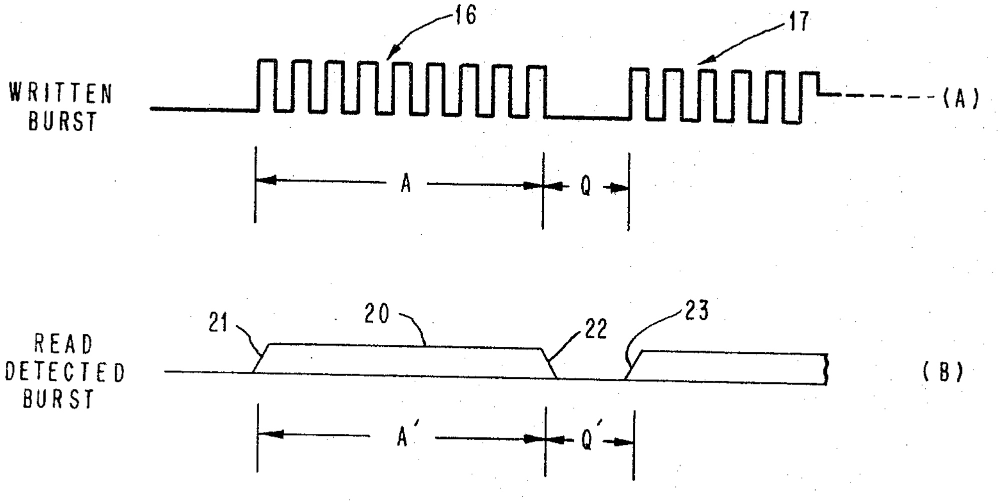
Figure 5:
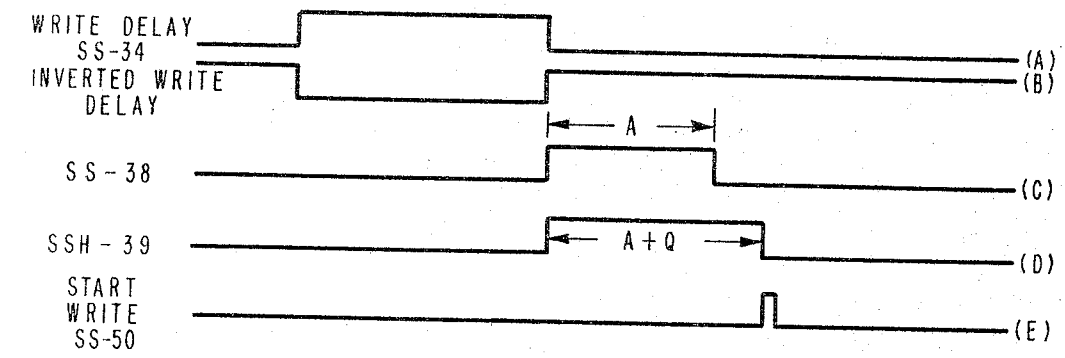
Figure 6:
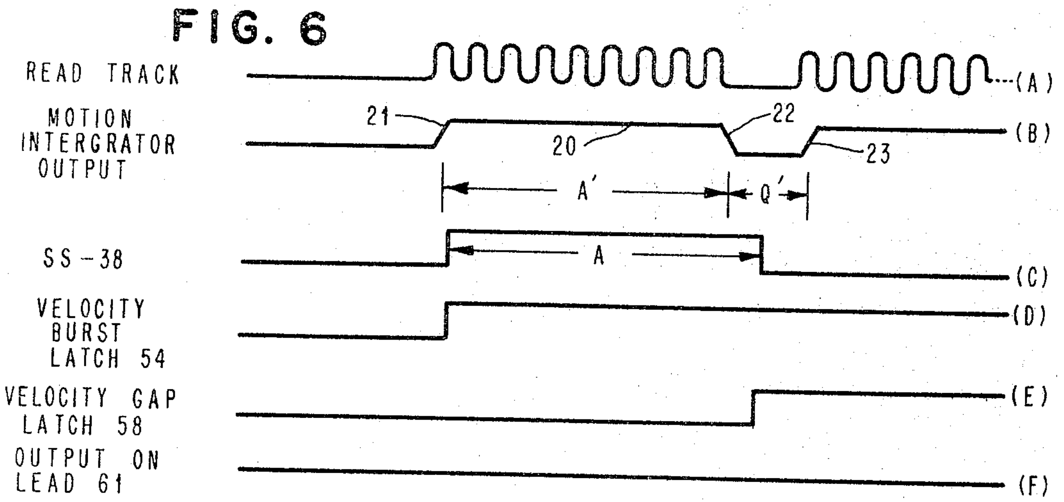
Figure 7:
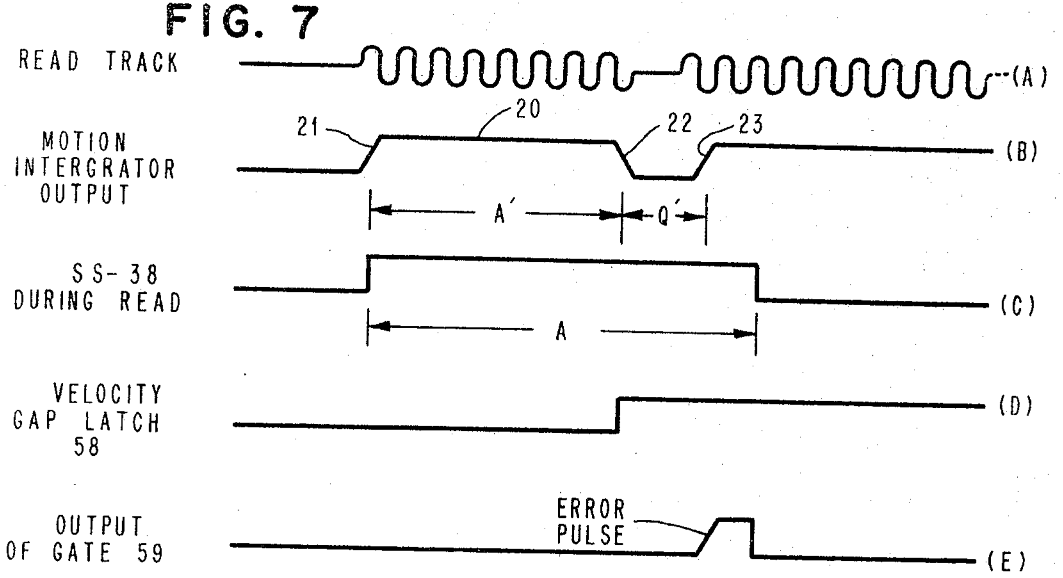
Figure 8:
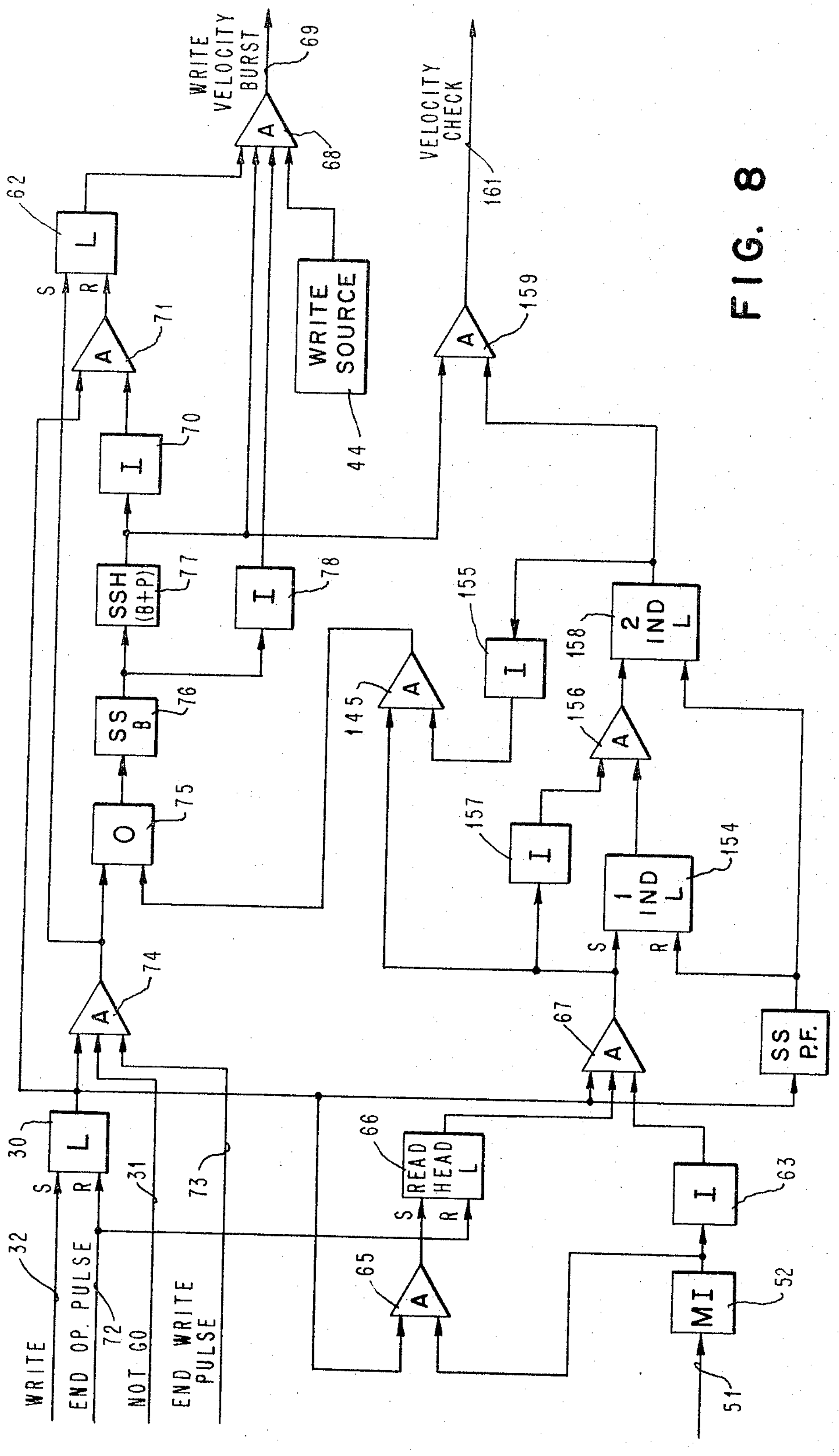

FIGURE 3 provides a curve representing tape velocity characteristics when accelerating and decelerating tape;

FIGURES 4*a* and 4*b* represent waveforms indicating how this invention may write its indications on tape and read those indications;

FIGURE 5 represents waveforms which can be found at various points within FIGURE 1 while it is controlling the writing of indicators on tape;

FIGURE 6 represents waveforms found at various points in circuit 1 when it is reading tape at approximately the same velocity as it was written;

FIGURE 7 represents waveforms found at various points in circuit 1 when reading tape at a substantially faster velocity than it was written;

FIGURE 8 represents another embodiment of this invention; and

Figure 9:
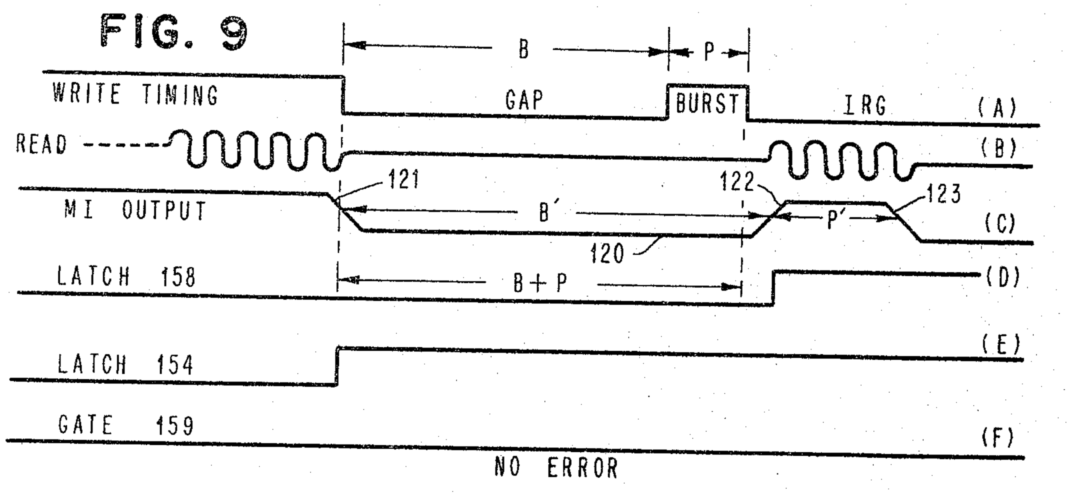
Figure 10:
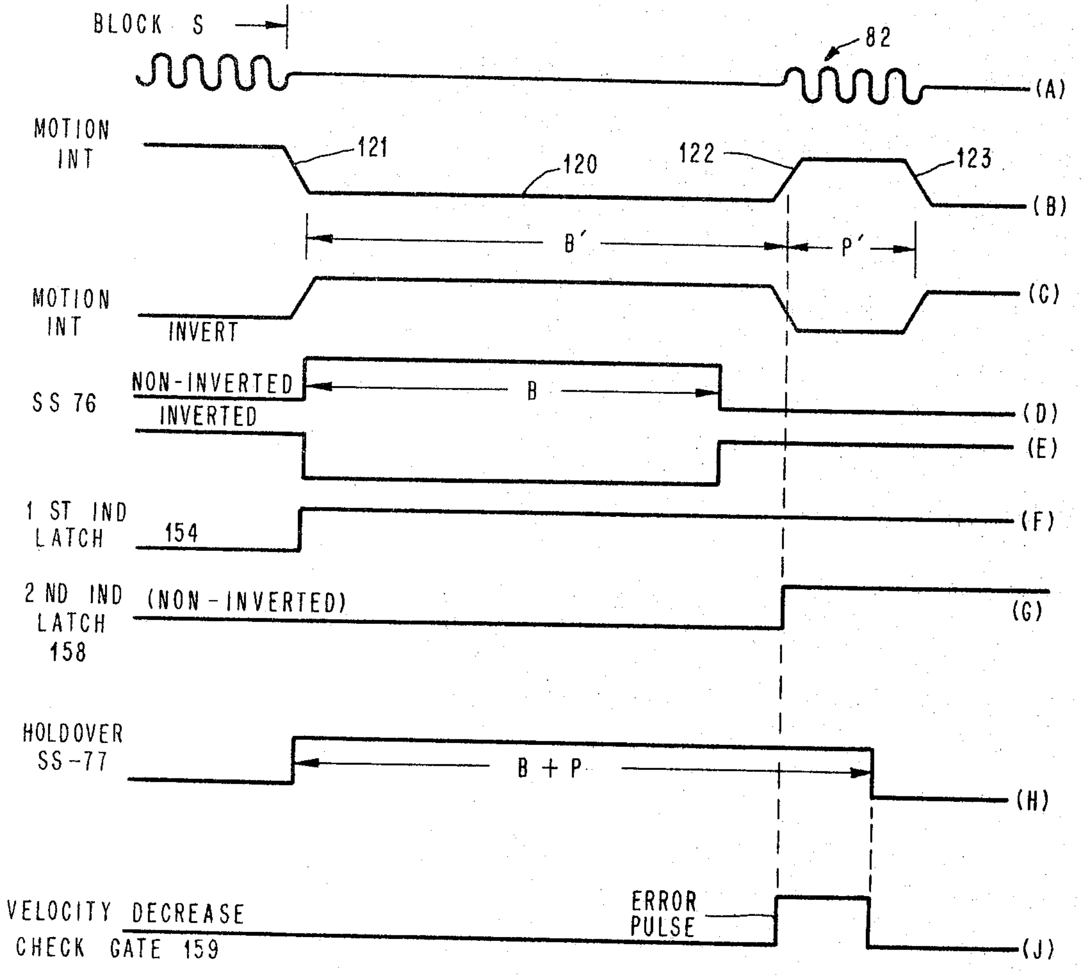

FIGURES 9 and 10 show waveforms used in explaining the operation of FIGURE 8.

This invention can be used to detect a deterioration in the operation of a tape drive capstan. An example of a capstan which may use this invention is described and claimed in U.S. patent application Ser. No. 246,757 and filed Dec. 24, 1962, now U.S. Patent 3,225,990. FIGURE 3 illustrates the tape velocity response that may be obtained from such a capstan. If the capstan is operating properly, the tape will begin moving approximately 1 millisecond after a tape "move" or "go" signal is provided to a capstan actuator coil; this amount of time is needed to overcome the initial mechanical inertia of the capstan actuator. However, once the capstan begins moving the tape, acceleration occurs very rapidly for the tape along the curves 27, 28 and 29 for a properly operating capstan. However, it has been found experimentally that when the capstan begins deteriorating, a plateau curve results such as represented by curves 27, 25 and 29 in FIGURE 3 which delays the time that the capstan reaches its nominal velocity. This invention can detect such deterioration in the capstan response, and it does this by utilizing the commonly used dual gap head, which in effect has separate read and write head gaps for the same tape track with substantial spacing, as between read (R) and write (W) gaps 11 and 12 in FIGURE 2 such as 0.15 inch.

During acceleration, this invention writes indicators on tape with a write head over a short period of time 18 in FIGURE 3, which occurs when the tape velocity has first reached approximate nominal velocity, when the capstan is properly operating. The time 18 indicators are written very close to the beginning of a data block by less than the spacing between the read and write gaps. The read head follows shortly thereafter and reads the indicators at time 19. Due to the substantial spacing between the read and write gaps, a deteriorating capstan response substantially effects the velocity while writing the indicators, but when the read head arrives to read them at later time 19, the tape has settled to substantially nominal velocity even though the capstan response has deteriorated. An acceleration indicator is shown in FIGURE 2 by a burst written over distance A in the inter-record gap (IRG) at a distance Q ahead of the beginning of block T.

This invention can also be used for determining an improper deceleration characteristic for magnetic tape. A proper deceleration characteristic is represented in FIGURE 3 by curve 80. If at time 0, the tape move signal is dropped, it takes approximately a millisecond for the capstan actuator to respond, after which the tape is decelerated at a fast rate along curve 80. This invention can cause the writing of a burst on tape immediately after the end of a block at time 81 represented by burst P in FIGURE 2 at a short distance B from the end of block S. The total distance $(B+P)$ is less than the spacing between read and write head gaps. When the read head arrives to read that burst at time 82, the tape has been decelerating at a fast rate if the braking operation is acting properly. Since the tape has slowed down considerably by time 82, the length of read time B′ is much longer than time B that it took to write the indications during time 81.

Figure 2:
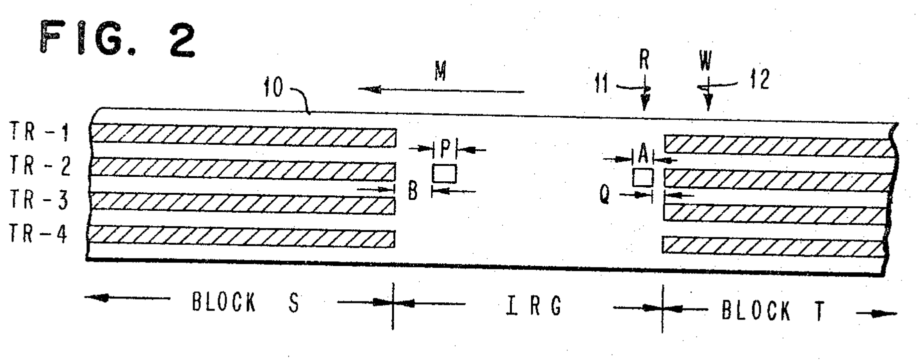
FIGURE 2 shows a recording on magnetic tape utilizing this invention.

FIGURE 1 illustrates a circuit for controlling the writing and reading of the acceleration indicators A in FIGURE 2. A single time-measuring device represented by single shots 38 and 39 are used for both writing the indicators, and for measuring them while they are read, so that any long-term instability in the timing devices does not effect the accuracy of the velocity change indication.

The circuit of FIGURE 1 is actuated whenever the tape is started from a stop condition. Thus a line 31 is provided to indicate the stop condition, which is determined by the tape move signal being down for a short period of time.

A line 32 is provided to indicate that a write instruction has been signalled by a pulse from a computer program controlling the tape drive system.

When write line 32 comes up while line 31 indicates a stop condition, an output is provided from an AND gate 33 to actuate a start write delay single-shot 34. Single-shot 34 times out most, but not all, of the write delay defining the last part of an inter-record gap (IRG). When delay single-shot 34 is actuated, its output sets a write burst latch 46. When the actuation of single-shot 34 terminates, its output drops and the output of inverter 36 is brought up to actuate a pulse-forming single-shot 35, which provides a pulse through an OR circuit 37 to actuate a velocity burst single-shot 38. A holdover single-shot 39 is actuated by the actuated output of single-shot 38. Single-shot 38 has an actuation period A; while holdover single-shot 39 has an actuation period of A plus Q relating to the times for writing the spacings A and Q in FIGURE 2. The output of single-shot 38 is also provided to an AND gate 47. A write source 44, write latch 30 and the output of write burst latch 46, are also provided to gate 47. Write source 44 may be the write clock in a tape control of conventional type; and it provides an output to gate 47, which can cause the writing of data bits on tape.

Under the conditions mentioned previously with latch 46 in set condition, a velocity burst will be provided on a lead 49 for a write head gap 12 (FIGURE 2) from AND gate 47 during the actuation period of single-shot 38.

After the termination of the velocity burst, the holdover period Q of single shot 39 is timing out. After single shot 39 times out, its output through inverter 41 is brought up to condition an AND gate 42, which however is also conditioned by the inverted delayed output of delay single-shot 34 and write latch 30, so that an output is provided from AND gate 42 at the instant that the holdover single-shot terminates its timeout period. Latch 46 is reset by the output from gate 42 to indicate by the output of inverter 45 that writing should start for a data block. This is done by an AND gate 43 which receives the output of inverter 45 and an output from write latch 30. Thus the output from gate 43 actuates a pulse-forming single-shot to signal the start of writing for a data block at the instant that single-shot 39 terminates holdover period Q. The writing started by the output of single-shot 50 may be the writing of data in a block, or it may be the writing of housekeeping bits, such synchronization bits prior to the writing of the data within the block.

The timings for single-shots 34, 38, 39 and 50 is shown in FIGURE 5.

The form of the burst written on tape by this operation is represented in FIGURE 4(A). There, a series of flux transitions 16 are written during time 18 represented by the actuation of single-shot 38. There will be no flux transitions on tape during the holdover period Q. But immediately thereafter, the writing of the block starts and is represented by the flux transitions 17. FIGURE 2 illustrates where they may appear on tape tracks, wherein there is shown recorded area A in track 2 prior to the recording of data block T. Thus the burst is written in the inter-record gap (IRG) immediately before the start of the block T. The read-write gaps 11 and 12 are representative of the gaps discussed above. Write gap 12 has written the burst A in track –2. Shortly after the write gap 12 has written the burst and the beginning of the block T, read head 11 arrives to read the burst.

The output of read head 11 is provided to a lead 51 in FIGURE 1 and is detected and integrated by a motion integrator circuit 52, which can be a conventional detector with a time constant that smooths the pulse peaks. The time constant is sufficiently short that it has a quick attack and release time as represented by the rise 21 and fall 22 of its output A′ in FIGURE 4(B), which is the detected form of the burst 15 in FIGURE 4(A).

Shortly after the termination of the burst, the beginning of the block is reached and the motion integrator output comes up again as indicated by rise time 23 in FIGURE 4(B). Accordingly, three indicators were provided on the tape represented by the rise 21 at the beginning of the burst the fall 22 at the end of the burst, and the rise 23 at the beginning of the block. The time occurring between the reading of these indicators will be about same as the corresponding relative times during the writing operation, only if the reading is done at about the same velocity. On the other hand, if the tape velocity during the writing was substantially less than during the reading, the time spacing among these three indicators will be different during the reading than existed during the writing. Thus the fact that the reading occurs at time 19 (in FIGURE 3) substantially later than the writing occurred at time 18 (which may be 1.3 milliseconds later) permits for a substantial difference between the reading and writing velocities.

The rise 21 (in FIGURE 4(B)) passes through an AND gate 53 in FIGURE 1 (since the write status from latch 30 remains up). The gate 53 output passes through an AND gate 48 and OR gate 37 to actuate velocity burst single-shot 38, and gate 53 simultaneously sets a velocity burst latch 54, which previously was reset by a pulse forming single-shot 40 when write latch 30 was set. The output of the velocity burst latch 54 conditions an AND gate 56, but gate 56 cannot provide an output at this time because its other input is degated by inverter 57 acting on the pulse level 20 shown in FIGURE 4(B). Thus no output is provided from gate 56 in response to the signal rise 21.

This output of single-shot 38 is provided to an AND gate 59 which can provide a velocity check indication pulse on its output lead 61 only if the read speed exceeds the write speed by a ratio greater than $A+Q/A$. In such a case the reading time for a burst written at substantially lower velocity would be much shorter than the writing time. If the reading time exceeds $A+Q$, a velocity error check will result on lead 61, in which case the actuation of single-shot 38 would be up when pulse rise 23 in FIGURE 4(B) occurred. In such case the fall 22 of pulse 20 would cause the bringing up of an output from inverter 57, which would cause an output from gate 56 to set a velocity gap latch 58. Its output then conditions AND gate 59, which provides an output if rise 23 occurs before the termination of the output from single-shot 38. The velocity check indication pulse terminates with the termination of actuation of single-shot 38. The check pulse may be used to set an error indicating latch (not shown) to indicate that a capstan acceleration response has become faulty.

The waveforms in FIGURE 6 illustrate the operation of the circuit when the tape speed has not substantially changed between the read and write gap functions. On the other hand, FIGURE 7 illustrates waveforms representing the operation of the circuit when the velocity check burst is written with the tape moving at a substantially slower velocity compared to the nominal velocity when the burst is read.

The waveforms in FIGURE 6(A) represent the reading of the velocity burst when the tape velocity is approximately the same during reading as during writing the burst. Thus there is provided from the motion integrator output, the waveform shown in FIGURE 6(B). Accordingly the rise 21 and fall 22 of pulse 20 and rise 23 at the block beginning occur with approximately the same time relationships as found with the writing of the burst and beginning of the block. Thus the time between rise 21 and fall 22 of pulse 20 is A′ (utilizing some threshold). Likewise the time Q′ between the fall 22 of the end of the burst and the rise 23 of the beginning of the block is also approximately the same as the corresponding points during writing. Accordingly single-shot 38 is actuated for time A as shown in FIGURE 6(C), and velocity burst latch 54 is actuated to provide the output shown in FIGURE 6(D). At the fall 22 of pulse 20, the velocity gap latch 58 provides its output rise as shown in FIGURE 6(E). But due to the fact that the beginning of block rise 23 occurs after the end of time-out A, there is no pulse provided on lead 61 to indicate any velocity check.

On the other hand, FIGURE 7 provides waveforms representing a write velocity which is substantially less than the read velocity, so that a velocity check output is provided. In this case, the written velocity burst will occupy a shorter length on tape than normal, and the gap generated over time Q will be shorter than normal. Accordingly, the spacing among the three indications 21, 22 and 23 shown in FIGURE 7(B) will be read at closer time intervals than normal. But the relative spacing among the indications 21, 22 and 23 can be seen in relation to the time A represented in FIGURE 7(C). The beginning of time A and the rise 21 of pulse 20 always must occur together due to the connections within the FIGURE 1. However, in this case, the rise 23 at the beginning of the block will occur prior to the end of period A in FIGURE 7(C). Accordingly, the input to gate 59 from single-shot 38 will be up when pulse rise 23 occurs, which will then pass a velocity check indicating pulse on lead 61 as shown in FIGURE 7(E).

FIGURE 8 shows circuitry for determining if tape deceleration is proper. A write latch 30 is set all during deceleration velocity check and is reset by an end operation pulse on lead 73 as soon as the velocity checking is completed. Also a read head latch 66 is set by the outputs of write latch 30 and motion integrator 52 received by an AND gate 65. Latch 66 indicates that the read checking head is within the written block. Thus at the end of a writing block, write latch 30 is still set, and an end-write pulse is provided on a lead 72. Also the tape go signal drops to the capstan actuator, and this brings up a signal on a not go lead 31 that causes an output from a gate 74 which passes through an OR circuit 75 to activate a burst delay single-shot 76 for about a 2.0 millisecond period. Simultaneously with the activation of single-shot 76, its output activates a holdover single-shot 77, which times out at the end of about 2.1 milliseconds. During proper capstan operation, the tape considerably decelerates by 2.0 milliseconds after the dropping of the tape go signal, as represented by time 82 in FIGURE 3. Thus in FIGURE 8, an inverter 78 inverts the output of single shot 76 to block an AND gate 68 which also is receiving an output from holdover single-shot 77. A degate latch 62 also provides an input to gate 68 and was set by the pulse from gate 74.

At the expiration of period B of single-shot 76, the output of inverter 78 comes up to activate AND gate 68, which provides a burst on a lead 69 that is written on tape by the write gap in track −2. The write burst ends with the expiration of the holdover period P of holdover single-shot 77. At the termination of period P, an output from an inverter 70 comes up and passes through an AND gate 71 (conditioned by write latch 30) to reset latch 62. Hence the write burst is only provided during holdover period P, shown in FIGURE 2.

Shortly after burst P is written, the read gap arrives at the end of the block and the output of motion integrator 52 drops, which brings up an output from an inverter 63 to an AND gate 67, that also receives an input from write latch 30 and read head latch 66 which are both up at this time. An output from AND gate 67 is then provided which sets a first indicator latch 154, which indicates when the read head reaches the end of the block. Thus FIGURE 9(E) shows the actuation of first indicator latch 154 at the fall 121 of the motion integrator output shown in FIGURE 9(C) which starts the period B′.

Also at the end of block, the rise in output from gate 67 passes through an AND gate 145 and OR circuit 75 to activate single-shot 76 and in turn single-shot 77.

However burst latch 62 is now in reset status and with no output from gate 74 at this time, no burst can be written again in response to the second actuation of single-shots 76 and 77.

At the end of time B′, the beginning of burst P (rise 122) is sensed on lead 51; and a motion-integrator output comes up, which drops the output of inverter 63 provided through gate 67 to another inverter 157, that now enables AND gate 56, which now sets second indicator latch 158 to indicate when the read head has reached rise 122 at the beginning of the burst P. This is seen in FIGURE 9(D).

Since it is expected that the tape will have slowed down considerably by the time the read head reaches the beginning of burst P (if the tape braking operation is operating properly), the actuation of holdover single-shot 77 for period $(B+P)$ will have subsided before time B′ expires (indicated by latch 158 being reset). On the other hand, if the tape braking operation is improper and the tape is not slowing quickly enough; and the tape velocity will be sufficiently fast that second latch 58 will be reset (end of B′) before the termination of $(B+P)$ indicated by the dropping of the output from holdover single-shot 77. An AND gate 159 provides an error check indication by having inputs from latch 158, and holdover single-shot 77. Thus an error indication is shown in FIGURE 10(J), since this occurs during the simultaneous activation of holdover single-shot 77 (shown in FIGURE 10(H)), and a previous setting of second indicator latch 158 shown in FIGURE 10(G). In this manner an indication is provided that the velocity has not decreased properly. However the fall 123 of the reading of the burst can be used instead of its rise 122 to determine proper velocity decrease.

Accordingly, it can be seen that this invention can be used for indicating both the improper deceleration of tape as well as the improper acceleration of tape to provide advanced warning about the deterioration of capstan acceleration operation or tape braking operation.

Accordingly, this invention can be provided for use with digitally recorded tapes for providing indications in the inter-record gaps regardless of the manner in which data is written, such as phase encoding, NRZI, etc.

It is of course recognized that the important indications represented by the rise and fall of pulses at 21, 22 and 23 can be provided in any other way that provides markers on tape, such as by pulses or other indications on tape.

For proper operation of the deceleration embodiment shown, a particular range of relationships of read-write gap spacing and deceleration characteristic are required.

While the invention has been particularly shown and described with reference to a preferred embodiment thereof, it will be understood by those skilled in the art that he foregoing and other changes in form and details may be made therein without departing from the spirit and scope of the invention.

What is claimed is:

1. A velocity change detection circuit comprising:
   a time measuring means for being actuated by at least one predetermined time interval,
   means for writing at least two indications on a surface under control of said time measuring means, with said indications being spaced from each other by the predetermined time interval as they are written,
   reading means having a predetermined spaced relationship from said means for writing, said reading means following said writing means and sensing both of said indications in subsequent time relationship,
   said time measuring means being actuated by the first one of said indications being read,
   and means for comparing the time of reading said second indication with the actuation of said time measuring means and providing an indication therefrom.

2. A tape velocity change detection circuit as defined in claim 1 in which,
   at least one of said indications is written in an inter-record gap between tape blocks.

3. A tape velocity change detection circuit as defined in claim 1 in which said comparing means comprises:
   an AND gate having inputs derived from said time measuring means and from said reading means.

4. A tape velocity change detection circuit as defined in claim 1 in which,
   said time measuring means comprises first and second fixed timing means,
   said second timing means having a longer period than said first timing means,
   an indicator bistable means being set by the reading of one of said indications,
   and said comparing means being an AND gate receiving outputs of said bistable means and one of said timing means.

5. A velocity change detection circuit as defined in claim 1 in which,
   said first indication is written prior to the leading boundary of a tape data block,
   and said second indication is at the leading boundary of the tape data block.

6. A velocity change circuit as defined in claim 5 in which,
   said first indication is the leading ledge of a signal burst written on magnetic tape, with said first indication terminating before said second indication.

7. A velocity change detection circuit as defined in claim 1 in which,
   said first indication is the trailing boundary of a tape data block,
   and said second indication is after the trailing boundary of the tape data block.

8. A velocity change detection circuit as defined in claim 7 in which,
   said second indication is the trailing edge of a signal burst written on magnetic tape, with the leading edge of said burst being after the trailing boundary of said block.

9. A tape velocity change detection circuit as defined in claim 1 in which,
   an indicator bistable means is set upon reading the first one of said indications,
   and an AND gate receiving inputs from said bistable means and said time measuring means.

10. A tape velocity change detection circuit as defined in claim 9 in which,
    said bistable means is set by one of said indications read after the first read indication,
    and said AND gate receiving inputs from said bistable means and said first timing means,
    whereby the output of said AND gate can provide an indication of insufficient tape acceleration.

11. A tape velocity change detection circuit as defined in claim 9 in which,
    said bistable means is set by one of said indications read after the first read indication,
    and said AND gate receiving inputs from said bistable means and said second timing means,
    whereby the output of said AND gate can provide an indication of insufficient tape acceleration.

References Cited by the Examiner

UNITED STATES PATENTS

| | | | |
|---|---|---|---|
| 2,558,249 | 6/1951 | Hewlett et al. | 340—174.1 |
| 2,807,003 | 9/1957 | Alrich | 340—174.1 |
| 2,903,605 | 9/1959 | Barney et al. | 340—174.1 |
| 2,989,690 | 6/1961 | Cook | 340—174.1 |
| 3,172,091 | 3/1965 | Friend | 324—70 |

BERNARD KONICK, *Primary Examiner.*

V. P. CANNEY, *Assistant Examiner.*

UNITED STATES PATENT OFFICE

CERTIFICATE OF CORRECTION

Patent No. 3,320,600 May 16, 1967

Lewis L. Headrick et al.

It is hereby certified that error appears in the above numbered patent requiring correction and that the said Letters Patent should read as corrected below.

Column 7, line 48, for "ledge" read -- edge --.

Signed and sealed this 19th day of November 1968.

(SEAL)
Attest:

Edward M. Fletcher, Jr.
Attesting Officer

EDWARD J. BRENNER
Commissioner of Patents